May 13, 1947. G. B. GREENE 2,420,395
RADIO DIRECTION FINDING CIRCUIT
Filed April 10, 1942
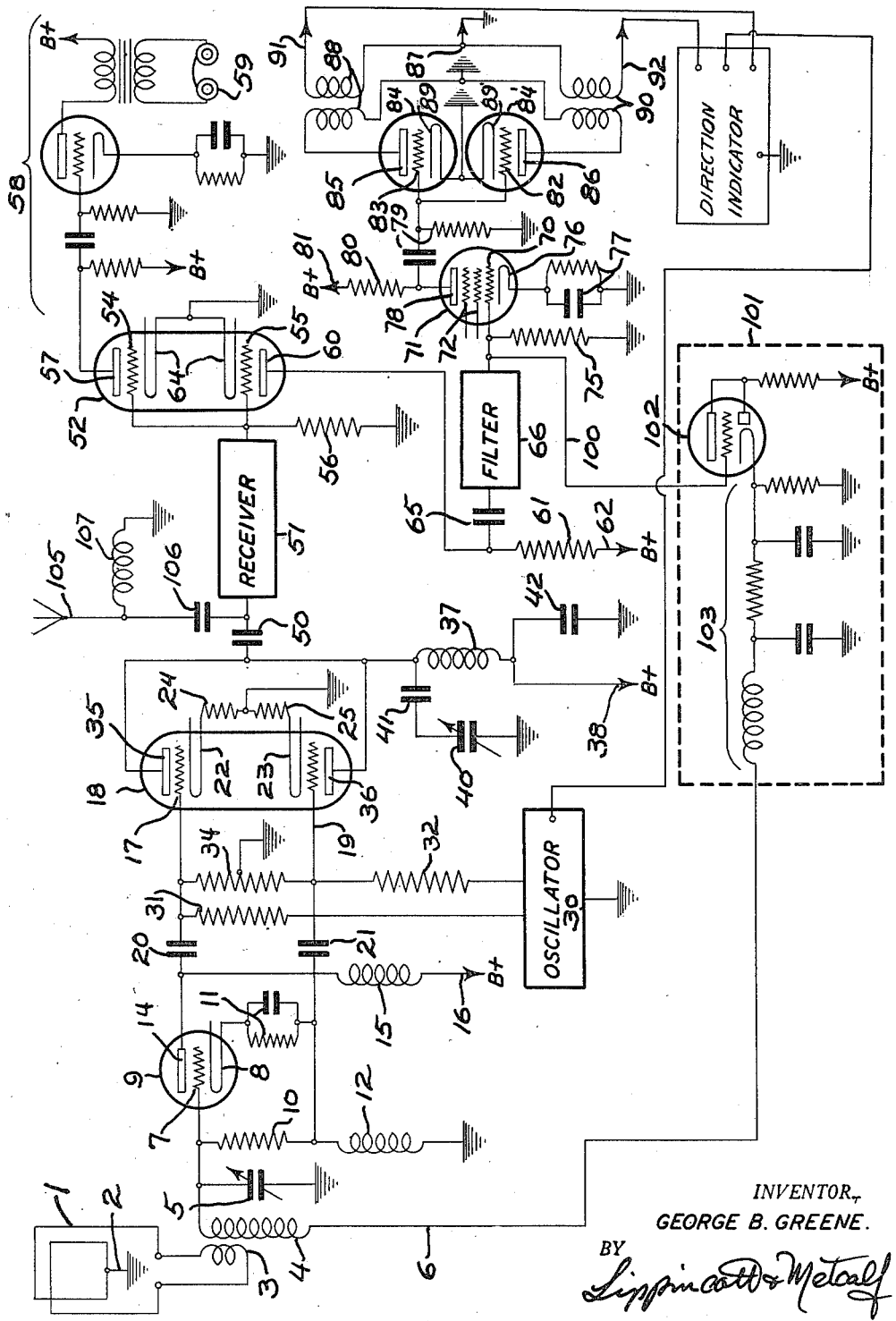
INVENTOR,
GEORGE B. GREENE.
BY
Lippincott & Metcalf
ATTORNEYS.

Patented May 13, 1947

2,420,395

UNITED STATES PATENT OFFICE 2,420,395

RADIO DIRECTION FINDING CIRCUIT

George B. Greene, Long Beach, Calif., assignor to Leo M. Harvey, La Canada, Calif.

Application April 10, 1942, Serial No. 438,488

8 Claims. (Cl. 250—11)

My invention relates to radio direction finding circuits, and more particularly to a circuit utilizing a directionally received component plus a non-directional component. The output of the system may be utilized in several ways, i. e., to orient a directional antenna so that it will maintain a predetermined position with relation to a radio transmitting station of known location, or if desired, the output of the circuit may be utilized to operate a servo-motor connected to steer a dirigible vehicle such as for example, an airplane, or to operate an indicator.

Among the objects of my invention are: To provide a radio direction finding circuit of the right and left indicating type, which will give a maximum modulation component for a given angle between the zero axis of an antenna system and the direction of reception of the waves; to provide a radio direction finding circuit which will operate over a maximum variation of intensity of the received waves; to provide a radio direction finding system wherein the reception characteristics may be made of substantially perfect cardioid pattern, giving a maximum of sensitivity; to provide a radio direction finding circuit utilizing both loop reception, and a non-directional antenna; to provide a radio direction finding system having an automatic loop volume control voltage whose origin is an A.-C. output component; to provide a means and method, in a direction finding system, directly mixing a non-directional signal with a directional signal to provide a radio direction finding system utilizing a novel phasing circuit, and to provide a simple, efficient, and reliable radio direction finding circuit.

My invention possesses numerous other objects and features of advantage, some of which, together with the foregoing, will be set forth in the following description of specific apparatus embodying and utilizing my novel method. It is therefore to be understood that my invention is applicable to other apparatus, and that I do not limit myself, in any way, to the apparatus of the present application, as I may adopt various other apparatus embodiments, utilizing the method, within the scope of the appended claims.

The drawing is a schematic wiring diagram showing one form my invention may take, this circuit being shown as having an output adapted to operate an indicator, or a servo-motor for the purpose of maintaining a loop antenna in a fixed predetermined relative position to a known and preferably fixed radio transmitting station, for the control of a dirigible vehicle, or for a follow-up control system to serve between two loop shafts with angular positions as determined by the conventional automatic direction finder means, such as for example, the system shown in the Gudie application, Serial No. 399,369, filed June 23, 1941, entitled Radio operated automatic pilot.

I refer directly to the drawing for a more detailed description of a preferred embodiment of my invention, as set forth therein. A directional signal component from a distant transmitting station is received on a loop antenna 1, the axis of which is the axis of reference for the direction of the received signals. The loop is provided with a grounded center tap 2, and a coupling coil 3 is connected across its two ends. This type of loop circuit makes it possible to balance the loop circuit accurately to ground, thus excluding all vertical antenna component from the signals delivered thereby, and giving the loop a reception characteristic of true sine wave form, i. e., the polar diagram of said characteristic accurately represents the theoretical figure 8 pattern.

The coupling coil 3 is the primary of the radio frequency transformer with the secondary coil 4 thereof tuned to the frequency of the received signal by means of a variable condenser 5. One end of the coil 4 is connected to a loop gain control circuit 6, later to be described. The other end of the coil 4 connects to the grid 7 of a phase inverting tube 9, the grid 7 also being connected to the cathode 8 through a resistor 10 and a biasing circuit 11. The junction of the biasing circuit 11 and resistor 10 is then grounded through a load inductance 12. Anode 14 of tube 9 is connected through a second load inductance 15 to an anode source of potential as indicated by arrow 16. The anode 14 is also connected to one grid 17 of a double triode tube 18, and the junction of cathode bias circuit 11 and resistor 10 is also connected to a second grid 19 of the double triode tube 18, each of the grids 17 and 19 being coupled to tube 9 through condensers 20 and 21 respectively.

Cathodes 22 and 23 of the respective upper and lower sections (as shown in the drawing) of the double triode tube 18 are connected through resistors 24 and 25 to ground. It will be obvious that while I prefer to utilize a double triode tube as described, in order to obtain accurately symmetrical wave forms that two separate and identical tubes of three or more contacts can be utilized if desired.

Hereafter tube 18 will be called the carrier suppressor tube, inasmuch as an oscillator control signal voltage wave is applied to grids 17 and 19 to cyclically swing the grids negatively, preferably below cutoff in push-pull relationship. This voltage wave is generated by a control signal oscillator 30 of conventional design feeding grid 17 through resistor 31, and grid 19 through resistor 32. The two grids are connected together by resistor 34, the mid-point of which is grounded. The control signal oscillator 30 has the primary requirement that the wave form generated thereby shall be symmetrical. The frequency developed by it however, is a matter of choice. It is preferred that this control signal oscillator operate somewhere in the range of from 100 to 200 cycles, but there is no theoretical limit to the frequency which may be used. It is merely convenient to use frequencies within the lower audio range. The R. F. output from carrier suppressor tube 18 has only two frequencies, i. e., the received signal plus and minus the control signal (A.-C.) frequency, the carrier being completely suppressed.

Anodes 35 and 36 of the respective upper and lower sections of the carrier suppressor tube 18, are connected together and then through an output inductance 37 to the anode potential source as indicated by arrow 38. Variable capacity 40 is connected from the anode end of inductance 37 to ground through a shunt capacity composed of capacities 40 and 41 in series, and the opposite end of inductance 37 is connected to ground through a series capacity 42. The shunt capacity for inductance 37 is made equal to capacities 40, 41 and 42 in series.

The output from carrier suppressor tube 18 which has been phased to be substantially 0° or 180° with the carrier as picked up by the non-directional sense antenna, as will be later described, is taken directly from the connected anodes through a coupling capacity 50 into a receiver 51, having the customary amplifier tubes feeding a detector such as for example, a diode. The output of this receiver is led into a double triode 52 with the grids 54 and 55 of the respective sections connected together and grounded through resistor 56. Anode 57 of the upper section of the tube, is connected to phone channel 58 of conventional design, terminating in earphones 59.

The anode 60 of the other section is connected through a resistor 61 to an anode voltage source as indicated by the arrow 62. Cathodes 64 of double triode tube 52 are connected together and grounded in the usual manner. Anode 60 is also connected through an output coupling condenser 65 to a control signal frequency narrow band pass filter 66, the output of which is the control signal component of the audio output of the lower section of tube 52.

This control signal frequency component is utilized in two manners. First, it is passed directly to the grid 70 of control signal amplifier tube 71, this tube preferably having additional grids 72, as well known in the art for proper control of the current therethrough, grid 70 being grounded through grid resistor 75. The cathode 76 of tube 71 is provided with the usual bias circuit 77 to ground. Anode 78 of tube 71 is supplied with plate current through plate resistor 80 from a source as indicated by arrow 81. Anode 78 is also coupled by coupling circuit 79 to the grids 82 and 83 of two trigger tubes 84 and 84' operating on the "thyratron" principle, whose anodes 85 and 86 are supplied with A.-C. through a center connection 87, from control signal oscillator 30, through output transformers 88 and 90 respectively.

Cathodes 89 and 89' of tubes 84 and 84' are connected together and grounded. The output circuits 91 and 92 of tubes 84 and 84' may be utilized to control servo-motor or indicator relays, if desired, as the current flowing in circuits 91 or 92 will be in accordance with the relative phase of the A.-C. reaching grids 82 and 83 and the phase of the oscillator. If a servo-motor is under the control of tubes 84 and 84', it may be utilized, if desired, to keep the axis of loop 1 pointed at the station from which the signals are being received, or, as above pointed out, for any other purpose it may be desired.

The output of filter 66 is also connected by line 100 to a loop gain control system as shown enclosed within broken line 101. This loop gain control circuit comprises a rectifier tube 102 feeding a delay and filter circuit 103, the output of which leads through line 6 to loop transformer secondary 4 and then to grid 7 of the phase inverter tube 9.

A sense antenna 105 is connected through an antenna coupling condenser 106 to the input of receiver 51. This sense antenna 105 is provided with a loading choke 107 connected thereto and to ground. Sense antenna 105 may be a vertical wire, or a horizontal wire antenna, but whatever form is used, the sense antenna should be substantially without directional characteristics, and should be effectively a vertical antenna when the circuit is used for direction finding with vertically polarized waves. Thus the non-directional component for the system is derived from the sense antenna. This component is entered, it will be noted, without inductive coupling, into receiver 51 along with the output of double triode tube 18. This arrangement eliminates phase distortion, such as is customarily encountered, when the more usual transformer is utilized at this point, with the secondary thereof connected to amplifier 51, and with separate primaries energized from carrier suppressor tube 18, and from sense antenna 105.

I will first describe the action of the phase inverter circuit comprising the loop 1 and tubes 9 and 18. The grids of the carrier suppressor tube 18 are, due to the action of the tube 9, each supplied with a directional R. F. signal from the loop, but with opposite R.-F. phase. The grids are operated in push-pull as far as A.-C. from oscillator 30 is concerned. This arrangement differs from most circuits of this type where grids 17 and 19 of a modulator tube are usually fed R. F. in parallel in this location in the circuit.

When the A.- C. from oscillator 30 is at zero E. M. F., the tube sections are biased to cutoff. As the A.-C. rises positively at grid 17 for example, the instantaneous bias provides conductivity in the related portion of the tube 18, as far as R.-F. phase is concerned. At the same time grid 19 is swinging more negative beyond cutoff. Then as the A.-C. swings negative on grid 17 and positive on grid 19, current to anode 35 is cut off and grid 19 is biased instantaneously for conductivity, suppressing the carrier, and conducting the side band energy. Thus anode 35 conducts current on the first A.-C. half cycle, and anode 36 conducts current on the last A.-C. half cycle, with a 60 cycle modulation and reverse R.-F. phase. When this current is mixed either in phase (or 180° out of phase) with the output of the sense antenna 105, the two will add on one half-cycle and subtract in the next half cycle.

In the suppressed carrier the R.-F. may be considered to be present at approximately carrier frequency, but turning over at the oscillation frequency of oscillator 30, when compared to the original carrier as resupplied by the sense antenna. The resultant current will demodulate as a straight A.-C. voltage, and is filterable from any transmitter produced modulation.

As the loop azimuth is reversed, the R.-F. phase turns over 180° in suppressor tube 18, and mixing with the sense antenna output just prior to amplifier 51 results in a turned-over A.-C. voltage. This turning over of the A.-C. voltage in accordance with the position of the loop axis with respect to the incoming signal direction, operates one or the other of the trigger tubes 84 or 84' to give the proper output current to control the servo-motor or indicator in the right direction.

The action of the automatic loop bias control as comprising tube 102 and delay circuit 103 is important. The AVC voltage delivered to line 6 and then to loop transformer secondary 4 is derived only, as above stated, from the control signal component of the audio output. At loop angles near the null position, the control signal component of the audio output is low. Consequently the delayed AVC action is substantially zero, providing the low end of the loop amplifier transformer with an effective ground. The tube 9 is thus biased to maximum gain. However, as the loop angle increases, AVC voltage is developed to reduce gain. Therefore the A.-C. modulated component, plotted against the loop angle gives a curve having a substantially rectangular shape instead of a sine wave form. Or, as might otherwise be expressed, the curve is basically a sine wave form of much greater amplitude, but with the amplitude limited to a definite voltage.

The action of the loop gain control therefore makes it possible to utilize a much greater initial loop gain, without danger of the loop output exceeding the sense antenna output. Consequently the system as a whole may be made to be extremely sensitive adjacent the null position of the loop, without danger of over-modulating the system by the loop output when the loop is away from the null position.

Thus it will be seen that I have incorporated in the circuit just above described several novel features. First, instead of feeding the two grids of tube 18, with loop signals in the same phase, I have supplied these grids with R.-F. which is out-of-phase. Secondly, I have been able to directly couple the loop circuit output with the output of the sense antenna, thus eliminating mutual inductive and unbalanced capacitive phase distortions invariably occurring when inductive couplings are used, and thirdly, I have incorporated in the system a loop gain control circuit, whereby the loop gain can be made a maximum adjacent the null position of the loop without danger of over-modulating the system at other positions of the loop.

While I have described the circuit of my invention as operating with a single loop, a single control signal oscillator and a single sense antenna feeding a single receiver, it is to be understood that additional loop-oscillator-antenna systems can be used to feed the same single receiver when the control signal oscillator signals are made having sufficient frequency difference to be separately filterable from the receiver output, so that additional servo-motors can be operated by the separated outputs.

I claim:

1. In radio direction finding apparatus, a directional antenna, means for tuning said directional antenna to a reference radio transmitter, a pair of balanced carrier suppressor tube electrode assemblies, circuit means including a phase inverting tube coupled to said directional antenna and having a capacitive coupling to said carrier suppressor tube electrode assemblies for exciting said suppressor tube electrode assemblies in reverse signal phase from said directional antenna, an oscillator connected to alternately bias said suppressor tube electrode assemblies, an amplifier, a non-directional antenna tunable to said reference transmitter and capacitor means coupling the output of said suppressor tube electrode assemblies and that of said non-directional antenna to said amplifier.

2. In radio direction finding apparatus, a directional antenna, means for tuning said directional antenna to a reference radio transmitter, a pair of balanced carrier suppressor tube electrode assemblies, circuit means including an inverter tube having a capacitive coupling to said balanced carrier suppressor tube electrode assemblies for exciting said suppressor tube electrode assemblies in reverse signal phase from said directional antenna, an oscillator connected to alternately bias said suppressor tube electrode assemblies, an amplifier, a non-directional antenna tunable to said reference transmitter and capacitor means coupling the output of said suppressor tube electrode assemblies and that of said non-directional antenna to said amplifier.

3. In radio direction finding apparatus, a directional antenna, means for tuning said directional antenna to a reference radio transmitter, a pair of balanced carrier suppressor tube electrode assemblies, circuit means including a phase inverting tube coupled to said directional antenna and having a capacitive coupling to said carrier suppressor tube electrode assemblies for exciting said suppressor tube electrode assemblies in reverse signal phase from said directional antenna, an oscillator connected to alternately bias said suppressor tube electrode assemblies negatively at a definite frequency, an amplifier, a non-directional antenna, capacitor means for coupling the output of said suppressor tube electrode assemblies and that of said non-directional antenna to said amplifier, means for demodulating the resultant current, a filter circuit connected to the output of said demodulating means and proportioned to pass substantially oscillator frequency only, and means responsive to the sense of the output of said filter circuit for operating a direction indicating device.

4. In radio direction finding apparatus, a directional antenna, means for tuning said directional antenna to a reference radio transmitter, a pair of balanced carrier suppressor tube electrode assemblies, circuit means including a phase inverting tube coupled to said directional antenna and having a capacitive coupling to said carrier suppressor tube electrode assemblies for exciting said suppressor tube electrode assemblies in reverse signal phase from said directional antenna, an oscillator connected to alternately bias said suppressor tube electrode assemblies below cutoff in push-pull relationship, means for combining the output of said suppressor tube electrode assemblies, a non-directional antenna feeding said combined output, and tuned to said same radio transmitter, means for demodulating the resultant current, a filter circuit connected to the output of said demodulating means and proportioned to pass substantially oscillator frequency only, and means responsive to the sense of the output of said filter circuit for operating a direction indicating device, said means including a pair of trigger tubes operated by the output of said filter circuit in accordance with the sense of the output thereof.

5. In radio direction finding apparatus, a directional antenna, means for tuning said directional antenna to a reference radio transmitter, means including an inverter tube having a center tapped capacitively coupled resistor in its output circuit for converting the signal received from said directional antenna into a pair of reverse phase signals, a pair of balanced output tube electrode assemblies, each having a grid therein connected to one end of said center tapped resistor, means for cyclically biasing said grids negatively at a constant frequency, means for combining the outputs of said tube electrode assemblies, and means for mixing a non-directional signal from said radio transmitter with the combined output of said tube electrode assemblies.

6. In radio direction finding apparatus, a directional antenna, means for tuning said directional antenna to a reference radio transmitter, means including an inverter tube having a center tapped capacitively coupled resistor in its output circuit for converting the signal received from said directional antenna into a pair of reverse phase signals, a pair of balanced output tube electrode assemblies, each having a grid therein connected to one end of said center tapped resistor, means for cyclically biasing said grids negatively at a constant frequency, means for combining the outputs of said tube electrode assemblies, capacitor means for mixing a non-directional signal from said radio transmitter with the combined output of said tube electrode assemblies, and means for demodulating the resultant mixed signal.

7. Apparatus in accordance with claim 3 and including means responsive to the output of said filter circuit for controlling the amplification of said directional signal to the exclusion of said non-directional signal, to maintain a predetermined amplitude relationship between the two signals.

8. Apparatus in accordance with claim 3 and including means responsive to the output of said filter circuit for preventing the directional signal from exceeding the non-directional signal.

GEORGE B. GREENE.

REFERENCES CITED

The following references are of record in the file of this patent:

UNITED STATES PATENTS

| Number | Name | Date |
| --- | --- | --- |
| 2,138,966 | Hafner | Dec. 6, 1938 |
| 2,220,904 | Hooven | Nov. 12, 1940 |
| 2,276,235 | Lamb | Mar. 10, 1942 |
| 2,143,178 | Wright | Jan. 10, 1939 |
| 2,314,029 | Bond et al. | Mar. 16, 1943 |
| 2,308,521 | Lear | Jan. 19, 1943 |

OTHER REFERENCES

Electronics, pp. 10 and 29, Oct. 1935.